United States Patent Office 2,753,319
Patented July 3, 1956

2,753,319

CAST POLYESTERURETHANE RUBBERS

Charles E. Brockway, Akron, Ohio, assignor to The B. F. Goodrich Company, New York, N. Y., a corporation of New York No Drawing. Application July 18, 1952, Serial No. 299,760

6 Claims. (Cl. 260—30.6)

This invention relates to synthetic elastomeric polymers of the polyesterurethane class and to the preparation thereof; more particularly it relates to cured rubbery products prepared by the condensation of certain polyesters with organic diisocyanates, the addition of certain polyfunctional hydroxyl compounds as curing agents, casting of the liquid mixture and subsequent heating to obtain elastic rubbery products of remarkable properties.

Reaction products of polymeric diols and organic diisocyanates that are liquid or fluid when warm can be prepared and cast into molds, so that on further treatment with heat, solid rubber-like products will be formed. Such cured rubber-like materials are obtained by mixing in proper sequence and under appropriate conditions, for example, a hydroxyl terminated polyester and an organic diisocyanate to form a polyesterurethane and while this is still fluid adding a suitable polyfunctional curing agent and heating the fluid mixture in a mold of any desired shape to effect a cure.

I have now discovered, quite unexpectedly, that when the molar ratio of the reactants required to prepare a cast rubbery product are controlled within rather critical limits a cured elastic polyesterurethane with outstandingly low hysteresis and permanent set values is obtained. For example, I am able to prepare by casting techniques and employing close control over the ratio of reactants, to be hereinafter set forth more fully, a cured rubbery polyesterurethane with a heat rise of only 1° F. when tested in the Goodrich flexometer at 212° F. with a 55 pound load and an 0.25 inch stroke, and a permanent set value of 0. This rubbery polymer is greatly superior to other presently known synthetic rubbers because of low heat build up on deformation and negligible permanent set.

In accordance with this invention a method is provided for obtaining rubbery polymers of superior physical properties by casting techniques. In the practice of this invention a predetermined amount of an organic diisocyanate is added to an anhydrous polyester which may contain a plasticizer and the mixture heated with agitation at a temperature sufficient to cause reaction in a liquid state. A controlled amount of a polyfunctional hydroxyl material is mixed into the liquid, gas bubbles removed by evacuation if necessary, and the mixture poured into a mold and cured at such temperatures and times as are required to effect a cure. The resulting product is a solid, tough, elastic, rubber-like product which exhibits very low hysteresis and permanent set and high tensile strength.

In order to achieve these results it is of critical importance that the molar ratio of the reactants employed be carefully controlled. There must be a molar excess of the organic diisocyanate over the total mols of polyester and polyfunctional hydroxyl curing agent employed. The preferred quantities employed are one mol of polyester, more than 1.3 mols of organic diisocyanate and between 0.1 and 1 mol of the polyfunctional hydroxyl curing agent. The preferred balance to be maintained between the reactants will be more fully disclosed in the examples given hereinafter. A preferred molar ratio is 1.0 polyester/1.5 organic diisocyanate/0.2 polyfunctional hydroxyl curing agent.

In the practice of this invention a preferred procedure is to melt together at about 90° C. 1 mol of a hydroxyl terminated polyester, average molecular weight about 1300, and 50 parts by weight, per 100 weight parts of polyester, of tricresyl phosphate; dry the mixture by degassing at about 1 mm. pressure and 90–100° C. for 10 minutes; add 1.5 mols of p-phenylene diisocyanate to the molten fluid and stir for 6 minutes at 90 to 95° C.; stir in 0.3 mol of glycerol for two minutes, and pour into a preheated mold which has been coated with silicone grease. The mold is then placed into an oven at 120° C. and cured for about 10 hours. The resulting cured product is a tough, rubbery, oil-resistant, oxidation resistant, material with a Goodrich hysteresis value of Δ1° F. at 212° F. and a permanent set value of 0.

The starting polyesters are prepared by an esterification condensation reaction of an aliphatic dibasic (dicarboxylic) acid or an anhydride thereof with a glycol. The preferred reactants are adipic acid and ethylene glycol. Polyesters with terminal carboxyl or hydroxyl groups may be prepared by reacting a molar excess of the appropriate acid or glycol. Those polyesters with terminal hydroxyl groups are the most useful for the purposes of this invention.

The dibasic acid and glycol are reacted together by heating, preferably at about 190° C. at atmospheric pressure for about 5 hours and while continuing to heat, the pressure is slowly reduced to about 1 mm. over a 10 to 15 hour period. During the initial heating period substantially all of the water of esterification and excess reactants are removed and this may be facilitated by bubbling nitrogen through the mass. Polyesters of average molecular weights of 600 to 2000 are obtained in this way. By continuing the evacuation and by heating the batch at higher temperatures, polyesters of molecular weights in the range of 2000 to 3000 or higher may be obtained. The polyester should be stored under anhydrous conditions if it is not utilized at once. If anhydrous polyester is not employed, bubbles may appear in the cured stock.

The polyester utilized includes polyesters prepared from the esterification of such dicarboxylic acids as malonic, succinic, glutaric, adipic, pimelic, sebacic, suberic, azelic, maleic and the like. It is not essential that the acid be used, the acid anhydride or acid chloride may be employed. Mixtures of acids may also be used.

The glycols utilized in the preparation of the polyester by reaction with the dicarboxylic acid may be ethylene glycol, 1,3-butanediol, 1,4-butanediol, pentamethylene glycol, hexamethylene glycol, diethylene glycol, triethylene glycol, 1,2-propanediol, 1,3-propanediol, 1,2-butanediol and the like. Mixtures of glycols may be employed.

The preferred organic diisocyanate for reaction with the polyester is a phenylene diisocyanate such as p-phenylene diisocyanate, m-phenylene diisocyanate or 4,4'-diisocyanato dibenzyl. Other organic diisocyanates which are useful include such aromatic diisocyanates as naphthylene-1,5-diisocyanate, diphenylmethane-p,p'-diisocyanate, triphenylmethane - p,p' - diisocyanate, meta-tolylene diisocyanate, aliphatic diisocyanates such as hexamethylene diisocyanate, mixtures of diisocyanates and the like.

The molar quantities of diisocyanate employed in the practice of this invention are 1.3 to 2.0 mols per mol of polyester with 1.3 to 1.6 mols preferred. When molar quantities above 1.6 are employed harder products are obtained. The amount of diisocyanate employed must be greater than the molar sum of polyester and hydroxyl-containing curing agent. When the molar amount of polyester and curing agent is greater than the mols of diisocyanate used there is obtained a soft stock of inferior physical properties.

The polyfunctional hydroxyl curing agent is preferably glycerol and other triols such as 1,1,1-trimethylol propane, trimethylolhexane, monoesters of pentaerythritol and the like. Low molecular weight polyesters with terminal hydroxyl groups prepared from a dibasic acid, glycol and a triol are particularly useful for this purpose. The glycols or polyesters of the types listed hereinbefore may also be employed as curing agents but the cure rate is much slower than that of a triol, such cures often have to be completed by ageing in the open atmosphere for several days. Mixtures of triols and diols result in cast rubbery polyesterurethanes with a good balance of physical properties. Other polyfunctional hydroxyl agents such as ethanolamine, diethanolamine and the like are very effective curing agents. Ethanolamine, in fact, may cause gelatin in the fluid mixture but may be employed in small amounts, for example, or with glycerol or ethylene glycol to effect a tight rapid cure. The amount of curing agent employed may be from 0.1 to 1 mol, with 0.2 to 0.5 mol preferred.

In the preparation of polyesterurethane castings bubbles of gas often appear in the solid cured product. These bubbles may be eliminated by degassing the liquid reaction mixture under vacuum prior to casting. They may also be eliminated by adding an organic ester plasticizer to the reaction mixture. The use of such a plasticizer decreases the viscosity of the fluid and allows gas bubbles to escape more rapidly. Also, curing the cast material in a closed mold in a press often solves this difficulty.

The plasticizer used to aid in the elimination of gas bubbles may be any that is compatible with the liquid polyesterurethane such as diphenyl octyl phosphate and tri-cresy phosphate, polyester plasticizers, methyl phthalate, benzyl phthalate, benzyl sebacate, N,N, dibutyl benzene sulfonamide, phenyl naphthyl ketone, dimethyl naphthalene, o-nitro biphenyl, butyl diglycol carbonate, tetrahydro furfuryl adipate and the like. The most important requirement of the plasticizer is that it be compatible with the polyester, does not react with the diisocyanate and has a high enough boiling point so that it will not be lost during evacuation if such a step is included.

From 10 to 50 parts by weight of plasticizer to 100 parts by weight of polyester are preferred for this use. The plasticizer is preferably added to the polyester prior to reaction with the diisocyanate but may be added mixed with the diisocyanate.

The molds used for these casting are preferably heated prior to casting and are coated with a silicone grease or permanently with polytetrafluoroethylene or other non-adhesive material to avoid sticking of the casting to the mold.

The following examples are given to illustrate the practice of the invention and more clearly to demonstrate its embodiments.

EXAMPLES 1 THROUGH 7

0.0386 mol (50 grams) of anhydrous hydroxyl terminated polyethylene adipate having an average molecular weight of about 1300 is weighed into a side arm Erylnmeyer flask and 50 parts by weight (25 grams) of tricresyl phosphate is added to the polyester in the flask which is placed upon a hot plate that has a surface temperature of about 120° C. A vacuum of about 0.5 mm. is applied to the flask and the mixture is evacuated for about ten minutes with intermittent swirling. A weighed amount (9.24 grams for Example 4) of p-phenylene diisocyanate, indicated in terms of molar ratio in Data Table I, is added to the liquid mixture which should be at a temperature of about 90° C. and the mixture stirred for about 6 minutes. The indicated amount (0.48 gram for Example 4) of ethylene glycol is then added to the mixture and the mixture again stirred vigorously for two minutes. If gas bubbles are present in the mixture it should be degassed for one minute. The molten mixture is immediately poured into preheated molds which have been coated with a silicone oil. The castings are oven cured at 120° C. for 10 hours and aged for several days in an open atmosphere. Pellets are cut from the moldings and dynamic properties determined by means of the Yerzley oscillograph and the B. F. Goodrich flexometer. The critical ratio of reactants required to obtain the cured product with superior properties is readily apparent from these data. Example 4 illustrates the ratio most usefully employed with ethylene glycol when a stock of low hysteresis is desired. The following Data Table I shows the mols of reactants used and the properties of the rubbery product obtained.

*Data Table I*

| Example | Mol Ratio of Reactants | | | Yerzley Resilience @ 77° F. | Properties of Cast Product—Flexometer, 55 lbs., 0.25" stroke @ 212° F. | | |
|---|---|---|---|---|---|---|---|
| | Polyethylene Adipate | p-Phenylene Diisocyanate | Ethylene Glycol | | Hardness Durometer "A" | Hysteresis, ΔT, °F. | Permanent Set, Percent |
| 1 | 1.00 | 1.50 | 0.50 | 80.3 | 62 | Blowout | |
| 2 | 1.00 | 1.50 | .40 | 88.2 | 62 | 22 | 2.96 |
| 3 | 1.00 | 1.50 | .30 | 87.0 | 50 | 9 | 1.12 |
| 4 | 1.00 | 1.50 | .20 | 88.1 | 41 | 2 | 0.00 |
| 5 | 1.00 | 1.40 | .40 | 85.3 | 56 | Blowout | |
| 6 | 1.00 | 1.40 | .30 | 88.6 | 56 | 25 | 2.15 |
| 7 | 1.00 | 1.30 | .30 | 82.7 | 51 | Melted | |

EXAMPLES 8 THROUGH 19

A series of castings are prepared using essentially the procedure outlined for Examples 1 through 7. Glycerol is used for the curing agent in this set rather than ethylene glycol. The molar ratios of reactants employed are indicated in Data Table II. These samples are cured by heating at 120° C. for 10–12 hours. A tight cure is obtained and no further ageing is required for these samples.

Data Table II

| Example | Mol Ratio of Reactants ||| Yerzley Resilience @ 77° F. | Properties of Cast Product—Flexometer, 55 lbs., 0.25″ stroke @ 212° F. |||
|---|---|---|---|---|---|---|---|
| | Polyethylene Adipate | p-Phenylene Diisocyanate | Glycerol | | Hardness Durometer "A" | Hysteresis, ΔT, ° F. | Permanent Set, Percent |
| 8 | 1.00 | 1.60 | 0.40 | 90.3 | 44 | 6 | 0.00 |
| 9 | 1.00 | 1.60 | 0.30 | 88.3 | 46 | 3 | 0.01 |
| 10 | 1.00 | 1.50 | 0.40 | 78.3 | 33 | 25 | 0.05 |
| 11 | 1.00 | 1.50 | 0.30 | 91.0 | 42 | 7 | 0.00 |
| 12 | 1.00 | 1.50 | 0.20 | 88.2 | 43 | 1 | 0.03 |
| 13 | 1.00 | 1.40 | 0.30 | 83.9 | 37 | 15 | −0.10 |
| 14 | 1.00 | 1.40 | 0.20 | 92.0 | 43 | 2 | −0.10 |
| 15 | 1.00 | 1.30 | 0.20 | 82.4 | 34 | Blowout | |
| 16 | 1.00 | 1.30 | 0.10 | 89.1 | 43 | 5 | 0.09 |
| 17 | 1.00 | 1.20 | 0.15 | 60.2 | 24 | too soft | |
| 18 | 1.00 | 1.20 | 0.10 | 86.5 | 37 | 17 | 0.29 |
| 19 | 1.00 | 1.10 | 0.05 | 74.0 | 30 | too soft | |

It is readily evident from these data that more than 1.3 mols of the organic diisocyanate are required to obtain cured products with superior hysteresis properties. It is apparent that more than 0.15 mol of the curing agent is required. It is further demonstrated here that there must be employed a molar excess of diisocyanate to obtain the desired physical properties.

EXAMPLE 20

A polyethylenepropylene adipate, prepared from adipic acid and ethylene and propylene glycol, at a mol ratio of about 6 to 4 of glycol, with an average molecular weight of 1930 is reacted with p-phenylene diisocyanate for 6 minutes at 95 to 100° C., for two minutes with ethylene glycol and cast into a heated mold. This product has no bubbles and is fluid enough to allow those forming during agitation to escape. The cured product, prepared by heating at 120° C. for 10 hours in an oven is free of bubbles. If the diisocyanate polyester reaction is conducted at 110–115° C. bubbles will be found in the cured product unless the reaction product is degassed just prior to pouring. The molar ratio of reactants is polyethylenepropylene adipate 1.0 mol, p-phenylene diisocyanate 1.5 mols, ethylene glycol 0.25 mol. The cured rubber product has outstandingly good physical properties.

The cured rubbery castings of this invention are particularly useful in mechanical goods applications where resistance to oxidation and certain chemicals, low permanent set and low hysteresis are required or desirable. Through the use of casting techniques the fluid uncured product may be cast into any form or shape, and may be poured directly into cavities and the like in metal or other articles and cured in situ, thus allowing easier assembly than in the case where solid products must be introduced into difficultly accessible areas.

Although I have described representative embodiments of the invention, I do not desire that it be limited solely thereto but only by the spirit and scope of the appended claims.

I claim:

1. A cured polyesterurethane casting having low hysteresis comprising the reaction product of an essentially hydroxyl terminated polyethylene adipate having a molecular weight of about 600 to 2500 with 1.3 to 1.6 mols of a phenylene diisocyanate in the presence of 10 to 50 weight parts per 100 weight parts of polyester of an organic plasticizer, and 0.1 to 0.4 mol of a polyfunctional aliphatic hydroxyl curing agent consisting essentially of a triol, said amount of phenylene diisocyanate being at least 0.2 mol excess over the sum of said polyethylene adipate and said polyfunctional aliphatic hydroxyl curing agent.

2. A cured polyesterurethane casting having low hysteresis comprising the reaction product of one mol of a hydroxyl polyethylene adipate having a molecular weight of 600 to 2000 with 1.4 to 1.6 mols of a phenylene diisocyanate in the presence of 10 to 50 weight parts per 100 weight parts of polyester of an organic ester plasticizer, and 0.2 to 0.4 mol of a polyfunctional aliphatic hydroxyl curing agent consisting essentially of glycerol, said amount of phenylene diisocyanate being at least 0.2 mol excess over the sum of said hydroxyl polyethylene adipate and said polyfunctional aliphatic hydroxyl curing agent.

3. A cured polyesterurethane casting having low hysteresis comprising the reaction product of a hydroxyl polyethylene adipate of a molecular weight about 1300 with about 1.5 mols of p-phenylene diisocyanate in the presence of about 50 weight parts per 100 weight parts of polyester of an organic phosphate ester plasticizer, and about 0.3 mol of glycerol.

4. The process for preparing cured polyesterurethane castings which comprises reacting together by heating a mixture of one mol of an essentially hydroxyl terminated polyethylene adipate having a molecular weight of about 600 to 2500 with 1.3 to 1.6 mols of a phenylene diisocyanate in the presence of from about 10 to 50 weight parts per 100 weight parts of polyester of an organic plasticizer, adding thereto from 0.1 to 0.4 mol of a polyfunctional aliphatic hydroxyl curing agent consisting essentially of a triol and curing to a solid state, said amount of phenylene diisocyanate being at least 0.2 mol excess over the sum of said polyethylene adipate and said polyfunctional aliphatic hydroxyl curing agent.

5. The process for preparing cured polyesterurethane castings which comprises reacting together by heating a mixture of one mol of hydroxyl polyethylene adipate having a molecular weight of 600 to 2000 with 1.4 to 1.6 mols of a phenylene diisocyanate in the presence of from 10 to 50 weight parts per 100 weight parts of polyester of an organic ester plasticizer, adding thereto from 0.2 to 0.4 mol of a polyfunctional aliphatic hydroxyl curing agent consisting essentially of glycerol and curing to a solid state, said amount of phenylene diisocyanate being at least 0.2 mol excess over the sum of said hydroxyl polyethylene adipate and said polyfunctional aliphatic hydroxyl curing agent.

6. The process for preparing cured polyesterurethane castings which comprises reacting together by heating a mixture of one mol of hydroxyl polyethylene adipate having a molecular weight of about 1300 with about 1.5 mols of p-phenylene diisocyanate in the presence of 50 weight parts per 100 weight parts of polyester of an organic phosphate ester plasticizer, and adding thereto about 0.3 mol of glycerol and curing to a solid state.

References Cited in the file of this patent

UNITED STATES PATENTS

| 2,424,884 | Cook et al. | July 29, 1947 |
| 2,620,516 | Muller | Dec. 9, 1952 |
| 2,621,166 | Schmidt et al. | Dec. 9, 1952 |

FOREIGN PATENTS

| 831,772 | Germany | Feb. 18, 1952 |

OTHER REFERENCES

De Bell et al.: German Plastics Practice, pp. 300–312, 1946.